United States Patent [19]
Kuszyk

[11] Patent Number: 5,100,837
[45] Date of Patent: Mar. 31, 1992

[54] METHOD OF MAKING CERAMIC COMPOSITE BODIES INCORPORATING FILLER MATERIAL AND BODIES PRODUCED THEREBY

[75] Inventor: Jack A. Kuszyk, Newark, Del.

[73] Assignee: Lanxide Technology Company, LP, Newark, Del.

[21] Appl. No.: 566,807

[22] Filed: Aug. 10, 1990

Related U.S. Application Data

[63] Continuation of Ser. No. 358,106, May 30, 1989, abandoned.

[51] Int. Cl.$^5$ .............. C04B 35/02; C04B 35/10; C04B 35/16; C04B 35/52
[52] U.S. Cl. ..................... 501/127; 501/128; 501/88; 501/92; 501/94
[58] Field of Search ............... 501/127, 87, 88, 92, 501/94, 128

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,713,360 | 12/1987 | Newkirk et al. | 501/87 |
| 4,826,643 | 5/1989 | Newkirk et al. | 264/57 |
| 4,828,785 | 5/1989 | Newkirk et al. | 264/59 |
| 4,833,110 | 5/1989 | Newkirk et al. | 501/128 |
| 4,851,375 | 7/1989 | Newkirk et al. | |
| 4,853,352 | 9/1989 | Newkirk et al. | |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0193292 | 3/1986 | European Pat. Off. . |

OTHER PUBLICATIONS

"Oxidation of Molten Aluminum Alloys, Reaction with Refractories"-M. Drouzy and M. Richard—Mar., 1974, Fonderie, France No. 332 pp. 121-128.

"Refractories for Aluminum Alloy Melting Furnaces'-'—B. Clavaud and V. Jose—Sep., 1980—Lillian Brassinga (from French) Jan., 1985.

Primary Examiner—William R. Dixon, Jr.
Assistant Examiner—Alan Wright
Attorney, Agent, or Firm—Mark G. Mortenson; Carol A. Lewis

[57] ABSTRACT

The present invention relates to a method of forming ceramic matrix composite bodies comprising a parent metal reacting with an oxidant to produce an oxidation reaction product which infiltrates a loose unbonded mass or a preform comprising a filler material mixture. Specifically, the filler material mixture used in the method of the present invention comprises a material having varying compositions, sizes and/or shapes of filler material within the mass or preform. By utilizing a filler possessing varying compositions, sizes and/or shapes, enhanced packing of the filler material is achieved which may result in improved properties, such as erosion resistance, corrosion resistance, etc. Further, the use of filler material containing varying sizes and/or shapes may also enhance the growth rate of oxidation reaction product, thereby reducing processing times for formation of the resultant ceramic composite body.

10 Claims, 1 Drawing Sheet

METHOD OF MAKING CERAMIC COMPOSITE BODIES INCORPORATING FILLER MATERIAL AND BODIES PRODUCED THEREBY

This is a continuation of copending application(s) Ser. No. 07/358,106 filed on May 30, 1989 is now abandoned.

FIELD OF THE INVENTION

The present invention relates to a method of forming ceramic matrix composite bodies comprising a parent metal reacting with an oxidant to produce an oxidation reaction product which infiltrates a mass or preform of filler material. Specifically, the filler material used in the method of the present invention comprises a filler material mixture having varying sizes and/or shapes of filler material within the mass or preform. By utilizing a filler possessing varying sizes and/or shapes, enhanced packing of the filler material is achieved which may result in improved properties, such as erosion resistance, corrosion resistance, etc. Further, the use of filler material containing varying sizes and/or shapes may also enhance the growth rate of oxidation reaction product, thereby reducing processing times for formation of the resultant body.

BACKGROUND

In recent years, there has been an increasing interest in substituting ceramics for metals because, with respect to certain properties, ceramics are superior to metals. There are, however, several known limitations or difficulties in making this substitution such as scaling versatility, capability to produce complex shapes, satisfying the properties required for the end-use application, and costs. Many of these limitations or difficulties have been overcome by the inventions disclosed in Patent Applications and Patents assigned to the same assignee as this Application and discussed in the subsequent section, which provide novel methods for reliably producing ceramic and ceramic composite materials, including net and near net shaped bodies. However, the need to improve upon the existing technology continues. This invention expands further the novel technology of producing ceramic and ceramic composite bodies.

DESCRIPTION OF COMMONLY-OWNED PATENTS AND PATENT APPLICATIONS

Several copending patent applications, and Issued Patents, assigned to an entity having a common ownership interest in this application (hereinafter sometimes referred to as "Commonly Owned Ceramic Matrix Patent Applications and Patents"), describe novel methods for reliably producing ceramic materials and ceramic composite materials. The method is disclosed generically in Commonly Owned U.S. Pat. No. 4,713,360, which was issued on Dec. 15, 1987, in the names of Marc S. Newkirk et al., and entitled "Novel Ceramic Materials and Methods for Making Same" (a related foreign counterpart to this patent which is a counterpart to application Ser. No. 591,392, now abandoned, was published in the EPO on Sept. 25, 1985, as European Publication No. 0,155,831). This Patent discloses a method of producing self-supporting ceramic bodies grown by reacting a molten parent precursor metal with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced or in certain cases enabled by the use of one or more dopants alloyed with the parent metal. For example, in the case of oxidizing aluminum in air, it is desirable to alloy magnesium and silicon with the aluminum to produce alpha-alumina ceramic structures.

The method of U.S. Pat. No. 4,713,360 was improved upon by the application of dopant materials to the surface of the parent metal, as described in Commonly Owned and Copending U.S. patent application Ser. No. 220,935, now allowed, filed June 23, 1988, which is a Rule 62 Continuation of application Ser. No. 822,999 filed Jan. 27, 1986, which is a continuation-in-part of application Ser. No. 776,965, filed Sept. 17, 1985, which is a continuation-in-part of application Ser. No. 747,788, filed June 25, 1985, which is a continuation-in-part of Ser. No. 632,636, filed July 20, 1984, all in the names of Marc S. Newkirk et al., and entitled "Methods of Making Self-Supporting Ceramic Materials" (a foreign counterpart to application Ser. No. 747,788 was published in the EPO on Jan. 22, 1986, as application Ser. No. 0,169,067).

A similar oxidation phenomenon was utilized in producing ceramic composite bodies as described in Commonly Owned U.S. Pat. No. 4,851,375, issued July 25, 1989, from U.S. patent application Ser. No. 819,397, filed Jan. 17, 1986, which is a continuation-in-part of application Ser. No. 697,876, filed Feb. 4, 1985, both in the names of Marc S. Newkirk et al., and entitled "Composite Ceramic Articles and Methods of Making Same" (a foreign counterpart to application Ser. No. 819,397 was published in the EPO on Sept. 3, 1986, as application Ser. No. 0,193,292). This novel methods for producing a self-supporting ceramic composite body by growing an oxidation reaction product from a parent metal precursor into a permeable mass of filler (e.g., particles, fibers, whiskers, bubbles, spheres, fiber mats, or the like comprising alumina, silicon carbide, etc., and/or ceramic-coated fillers, such as carbon fibers coated with alumina or silicon carbide) thereby infiltrating or embedding the filler with a ceramic matrix. The resulting composite, however, has no defined or predetermined geometry, shape, or configuration.

A method for producing ceramic composite bodies having a predetermined geometry, or shape is disclosed in Commonly Owned and U.S. Pat. No. 5,017,526, which issued on May 21, 1991, from U.S. patent application Ser. No. 338,471, filed Apr. 14, 1989, as a Rule 62 Continuation of application Ser. No. 861,025, filed May 8, 1986, in the names of Marc S. Newkirk et al., and entitled "Shaped Ceramic Composites and Methods of Making the Same" (a foreign counterpart to application Ser. No. 861,025 was published in the EPO on Nov. 11, 1987 as application Ser. No. 0,245,192). In accordance with the method of this U.S. Patent Application, the developing oxidation reaction product infiltrates a permeable self-supporting preform of filler material (e.g., particles, fibers, whiskers, bubbles, spheres, fiber mats, or the like comprising alumina, silicon carbide, etc., and/or ceramic-coated fillers, such as carbon fibers coated with alumina or silicon carbide) in a direction towards a defined surface boundary to result in composite bodies having predetermined geometries or shapes.

It was discovered that even higher shape fidelity could be achieved by providing the self-supporting preform (or loose filler material) with a barrier means, as disclosed in Commonly Owned U.S. Pat. No. 4,923,832, which issued on May 8, 1990, from U.S. patent application Ser. No. 861,024, filed May 8, 1986, in the names of Marc S. Newkirk et al., and entitled "Method of Making Shaped Ceramic Composites with the Use of a Barrier" (a foreign counterpart to this Application was published in the EPO on Nov. 11, 1987 as application Ser. No. 0,245,193). This method produces shaped self-supporting ceramic bodies, including shaped ceramic composite bodies, by growing the oxidation reaction product of a parent metal precursor to a barrier means spaced from the metal for the purpose of establishing a boundary or surface.

A method for tailoring the constituency of the metallic component of a ceramic matrix composite structure is disclosed in Commonly Owned U.S. patent application Ser. No. 908,454, filed Sept. 17, 1986, now abandon in the names of Marc S. Newkirk et al., and entitled "Method for In Situ Tailoring the Metallic Component of Ceramic Articles and Articles Made Thereby" (a foreign counterpart to this application was published in the EPO on Apr. 6, 1988, as application Ser. No. 0,262,051).

Moreover, U.S. Pat. No. 4,818,734, which issued on Apr. 4, 1989, in the names of Robert C. Kantner et al., was a Continuation-in-Part application of Ser. No. 908,454. This patent has the same title as application Ser. No. 908,454 and is also Commonly Owned. Both the patent application and patent disclose a method for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by forming the desired metallic component in situ, rather than from an extrinsic source, or by post-forming techniques.

As discussed in these Commonly Owned Ceramic Matrix Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum) is heated to an elevated temperature above its melting point but below the melting point of the oxidation reaction product to form a body of molten parent metal which reacts upon contact with an oxidant to form an oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product upon contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents and in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum, and the created growth alloy is utilized as the parent metal. The resulting oxidation reaction product of such a growth alloy comprises alumina, typically alpha-alumina.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, a barrier means may be used in combination with the filler (or preform) to establish a boundary or surface for the ceramic composite structure.

Thus, the aforesaid Commonly Owned Ceramic Matrix Patent Applications and Patents describe the production of oxidation reaction products which are readily grown to desired sizes and thicknesses heretofore believed to be difficult, if not impossible, to achieve with conventional ceramic processing techniques.

The entire disclosures of all of the foregoing Commonly Owned Ceramic Matrix Patent Applications and Patents are expressly incorporated herein by reference.

SUMMARY OF THE INVENTION

In a preferred embodiment of the invention, a ceramic composite body is made by growing an oxidation reaction product into a filler material, the filler material comprising a mixture of one or more materials having varying sizes and/or shapes. The filler material mixture can be configured into either an unbonded mass or a preform. The oxidation reaction product which grows into the filler material mixture comprises the product of an oxidation reaction of a molten parent metal (e.g., aluminum) with an oxidant. Specifically, the filler material mixture or mixture of materials comprising the preform (it should be understood that the terms "filler material" and "preform" may be used substantially synonymously herein, and when only one is referred to, it is for clarity only) is positioned adjacent to a source of parent metal such that formation of an oxidation reaction product of the parent metal will occur in a direction towards an oxidant (e.g., a solid, liquid and/or a vapor oxidant) and into the filler material mixture. Moreover, a barrier means can be used in combination with the filler material mixture, said barrier means being capable of locally inhibiting, poisoning, stopping, interfering with, preventing or the like, continued growth of the oxidation reaction product. Typically, the parent metal is heated to a temperature above its melting point, but below the melting point of its oxidation reaction product, to form a body of molten metal. At this temperature, or within this temperature range, the molten metal reacts with the oxidant to form the oxidation reaction product. At least a portion of the oxidation reaction product is maintained in contact with and between the molten metal and the oxidant to draw molten metal through the oxidation reaction product towards and into contact with the oxidant such that fresh oxidation reaction product continues to form at an interface between the oxidant and previously formed oxidation reaction product, thus infiltrating the adjacent filler material mixture. The reaction is continued for a time sufficient to infiltrate at least a portion of the filler material mixture with a polycrystalline material consisting essentially of the oxidation reaction product of the parent metal and, optionally, at least one non-oxidized metallic constituent which is dispersed or distributed throughout the polycrystalline material.

The filler material mixture should be sufficiently permeable to permit or accommodate growth of the oxidation reaction product within the mixture, and to permit the gaseous oxidant (if a gaseous oxidant is used) to permeate the mixture and contact the molten parent metal. Further, the filler material mixture composition may be homogeneous (e.g., SiC particles) or heterogeneous (e.g., SiC and alumina particles). Still further, the filler material may comprise mixtures of particles, whiskers, fibers, etc., of varying size, shape, morphology, etc., to, for example, enhance packing of the filler material mixture, while maintaining sufficient permeability of the filler material mixture to the oxidant to permit oxidation reaction product growth. It should be understood that the polycrystalline matrix material comprising the oxidation reaction product may exhibit voids or porosity in place of the metallic constituent, but the volume percent of voids will depend largely on such conditions as temperature, time, dopants, and type of parent metal. If a barrier means is used, the ceramic composite body will continue to grow to the barrier means, provided that sufficient parent metal is present to permit such growth.

In a preferred embodiment of the invention, the filler material mixture comprises a mass of filler material or a preform of filler material containing varying particle sizes of one or more materials having a similar (e.g., SiC and SiC particulate of different sizes) or a different (e.g., SiC and $Al_2O_3$ particulate of different sizes) chemical composition, which may enhance the packing efficiency of the filler material mixture, thus increasing the amount of filler material in a resulting ceramic composite body relative to a ceramic composite body which does not have such efficient particle packing. Properties such as hardness, erosion resistance, corrosion resistance, etc., may be enhanced due to the increased packing efficiency of particles in the formed composite body. Moreover, by using a filler material mixture of appropriate sizes and shapes, a faster growth rate of oxidation reaction product may be achieved. While applicant does not wish to be bound by any one theory, applicant believes that, as compared to a mixture of filler material comprising uniform fine particulate filler material, a filler material comprising varying sizes of coarse and fine filler material is observed to contain larger channels and/or voids between the particles (even though a higher volume percentage of filler may be present due to packing efficiency). Upon contact of molten parent metal with the filler material mixture or preform in the presence of an oxidant, these channels or voids provide a less tortuous path for growth of oxidation reaction product into either a loose mass of filler material or a preform comprised of the above-described filler material mixture. Apparently, when utilizing a filler material mixture, as, for example, in the case of silicon carbide which has been prefired to allow the formation of a protective silicon dioxide coating on the filler material, the level of silicon dioxide formed in combination with the lesser tortuosity in the filler material, may lead to a faster growth rate of oxidation reaction product. It should be noted that the silicon dioxide may act as both a dopant and an oxidant in the formation of oxidation reaction product. Further, due to the higher packing of filler material in a preform comprised of the above-described mixture, less space is available for embedment by oxidation reaction product. This may tend to reduce the overall time necessary for formation of oxidation reaction product to produce a given ceramic matrix composite body. It is believed that the rate of oxidation reaction product growth may be affected by the dopant content, e.g., a silicon source such as $SiO_2$, of the filler material. Specifically, the rate of growth may be a function of the available surface area of dopant coated filler material which provides dopant to the system and the time and temperature at which prefiring is carried out. In some cases, e.g., when a high surface area of dopant coated filler material is utilized, excessive quantities of certain dopants may build up at the interface between the molten metal and the oxidant. This dopant build-up may adversely affect the growth rate of the oxidation reaction product within the body of filler material and thus extend the amount of time needed to grow a ceramic composite body of a given size or thickness.

Although prefiring of the filler material mixture may be beneficial, it is not essential to the formation of ceramic composite bodies by the method of this invention. Specifically, a mixture of non-prefired filler material may be embedded by oxidation reaction product to result in the formation of a ceramic composite body. When the composition of the filler material mixture is harder than the surrounding matrix of oxidation reaction product, the resultant highly-loaded ceramic composite body may exhibit increased hardness, erosion resistance, etc. Further, this method may require the addition of one or more dopant materials to the growth alloy (e.g., in a preferred embodiment a silicon-containing dopant) to permit the formation of oxidation reaction product. One potential difficulty with not prefiring the filler material is the formation of aluminum carbide upon reaction of aluminum parent metal with a non-prefired silicon carbide filler material. The temperature at which the oxidation reaction is carried out and time of reaction may be used to control the formation of aluminum carbide by carrying out the oxidation reaction at temperatures below about 950° C.

Definitions

"Aluminum", etc., as used herein means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Barrier" or "barrier means" as used herein may be any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Carcass" or "Parent Metal Carcass" as used herein refers to any of the original body of parent metal remaining which has not been consumed during formation of the ceramic composite body and typically, which remains in at least partial contact with the formed body. It should be understood that the carcass may also typically include some oxidized constituents of the parent metal and/or a second or foreign metal therein.

"Ceramic" as used herein should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1–40 percent by volume, but may include still more metal.

"Ceramic Composite Body" or "Ceramic Matrix Composite" as used herein means any ceramic matrix embedding a filler material and wherein said ceramic matrix comprises an oxidation reaction product.

"Dopants" as used herein means materials (alloy constituents or constituents combined with and/or included in and/or in or on a filler) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation. Dopants may:

(1) create favorable surface energy relationships which enhance or induce the wetting of the oxidation reaction product by the molten parent metal;

(2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product;

(3) cause microstructural modifications of the oxidation reaction product as it is formed or subsequently, alter the metallic constituent composition and properties of such oxidation reaction product; and/or (4) enhance growth nucleation and uniformity of growth of oxidation reaction product.

"Filler" or "Filler Material Mixture" as used herein mixtures of constituents which are substantially non-reactive with and/or of limited solubility in the metal (e.g., parent metal) and/or oxidation reaction product and may be single or multi-phase. The mixture of constituents may comprise mixtures (e.g., different particle sizes) of materials having a similar (e.g., SiC and SiC) chemical composition but having a different size, shape or morphology; or mixture may comprise mixtures of materials having a different chemical composition (e.g., SiC and $Al_2O_3$) having substantially the same (e.g., particle sizes substantially the same) or substantially different (e.g., different particle sizes) sizes, shapes or morphologies. Fillers may be provided in a wide variety of forms, such as powders, flakes, platelets, microspheres, whiskers, bubbles, etc., and may be either dense or porous. Filler may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Growth Alloy" as used herein means an alloy which (1) contains initially, and/or (2) obtains at some point during processing, a sufficient amount of requisite constituents to result in growth of oxidation reaction product therefrom.

"Liquid-Phase Oxidant" or "Liquid Oxidant" as used herein means an oxidant in which the identified liquid is the sole, predominant or at least a significant oxidizer of the parent or precursor metal under the conditions of the process.

Reference to a liquid oxidant means one which is a liquid under the oxidation reaction conditions. Accordingly, a liquid oxidant may have a solid precursor, such as a salt, which is molten at the oxidation reaction conditions. Alternatively, the liquid oxidant may have a liquid precursor (e.g., a solution of a material) which is used to impregnate part or all of the filler material mixture and which is melted or decomposed at the oxidation reaction conditions to provide a suitable oxidant moiety. Examples of liquid oxidants as herein defined include low melting glasses.

If a liquid oxidant is employed in conjunction with the parent metal and a filler material mixture, typically, the entire bed of filler, or that portion comprising the desired ceramic body, is impregnated with the oxidant (e.g., by coating or immersion in the oxidant).

"Nitrogen-Containing Gas Oxidant" as used herein means a particular gas or vapor in which nitrogen is the sole, predominant or at least a significant oxidizer of the parent or precursor metal under the conditions existing in the oxidizing environment utilized.

"Oxidant" as used herein means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, a halogen, sulphur, phosphorus, arsenic, carbon, boron, selenium, tellurium, and or compounds and combinations thereof, for example, silica or silicates (as a source of oxygen), methane, ethane, propane, acetylene, ethylene, propylene (the hydrocarbon as a source of carbon), and mixtures such as air, $H_2/H_2O$ and $CO/CO_2$ (source of oxygen), the latter two (i.e., $H_2/H_2O$ and $CO/CO_2$) being useful in reducing the oxygen activity of the environment.

"Oxidation Reaction Product", as used herein in conjunction with ceramic matrix or ceramic matrix composite bodies, means one or more metals in any oxidized state wherein the metal(s) has given up electrons to or shared electrons with another element, compound, or combination thereof. Accordingly, an "oxidation reaction product" under this definition includes the product of reaction of one or more metals with one or more oxidants.

"Oxygen-Containing Gas Oxidant" as used herein in conjunction with ceramic matrix or ceramic matrix composite bodies is a particular gas or vapor in which oxygen is the sole, predominant or at least a significant oxidizer of the parent or precursor metal under the conditions existing in the oxidizing environment utilized.

"Parent Metal", as used herein in conjunction with ceramic matrix or ceramic matrix composite bodies, means that metal(s) (e.g., aluminum, silicon, titanium, tin and/or zirconium) which is the precursor of a polycrystalline oxidation reaction product and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, etc.), the metal identified should be read with this definition in mind unless indicated otherwise by the context.

"Preform" or "Permeable Preform", as used herein in conjunction with ceramic matrix or ceramic matrix composite bodies, means a porous mass of filler material mixture which is manufactured with at least one surface boundary which essentially defines a boundary for growing oxidation reaction product, such mass retaining sufficient shape integrity and green strength to provide dimensional fidelity prior to being infiltrated by the ceramic matrix. This mass is: (1) sufficiently porous to allow the vapor-phase oxidant (if a vapor-phase oxidant is used) to permeate the preform and contact parent metal, and (2) sufficiently permeable to accommodate development or growth of oxidation reaction product. A preform typically comprises a bonded array or arrangement of a filler material mixture, the mixture being either homogeneous or heterogeneous, and may be comprised of any suitable material (e.g., ceramic and/or metal particulates, powders, fibers, whiskers, etc., and any combination thereof). A preform may exist either singularly or as an assemblage.

"Second or Foreign Metal" means any suitable metal, combination of metals, alloys, intermetallic compounds, or sources of either, which is, or is desired to be, incorporated into the metallic component of a formed ceramic body in lieu of, in addition to, or in combination with unoxidized constituents of the parent metal. This definition includes intermetallic compounds, alloys, solid solutions or the like formed between the parent metal and a second metal.

"Solid-Phase Oxidant" or "Solid Oxidant" as used herein means an oxidant in which the identified solid is the sole, predominant or at least a significant oxidizer of the parent or precursor metal under the conditions of the process.

When a solid oxidant is employed in conjunction with the parent metal and a filler material mixture, it is usually dispersed throughout the entire bed of filler material mixture or that portion of the bed into which the oxidation reaction product will grow, the solid oxidant being, for example, particulates admixed with the filler or coatings on the filler particles. Any suitable solid oxidant may be thus employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal, the resulting oxidation reaction product comprises aluminum boride.

In some instances, the oxidation reaction of the parent metal may proceed so rapidly with a solid oxidant that the oxidation reaction product tends to fuse due to the exothermic nature of the process. This occurrence can degrade the microstructural uniformity of the ceramic or ceramic composite body. This rapid exothermic reaction can be ameliorated by mixing into the composition relatively inert fillers which absorb the excess heat. An example of such a suitable inert filler is one which is identical, or substantially identical, to the intended oxidation reaction product.

"Vapor-Phase Oxidant" as used herein means a particular gas or vapor and in which the identified gas or vapor is the sole, predominant or at least a significant oxidizer of the parent or precursor metal under the conditions obtained in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "Oxygen-Containing Gas Oxidant" but not within the definition of a "Nitrogen-Containing Gas Oxidant" (an example of a "nitrogen-containing gas" oxidant is forming gas, which typically contains about 96 volume percent nitrogen and about 4 volume percent hydrogen) as those terms are used herein and in the claims.

BRIEF DESCRIPTION OF THE FIGURES

The following figures are provided to assist in understanding the invention, but are not intended to limit the scope of the invention. Similar reference numerals have been used wherever possible in each of the Figures to denote like components, wherein.

DETAILED DESCRIPTION OF THE INVENTION AND PREFERRED EMBODIMENTS

Figure 1:
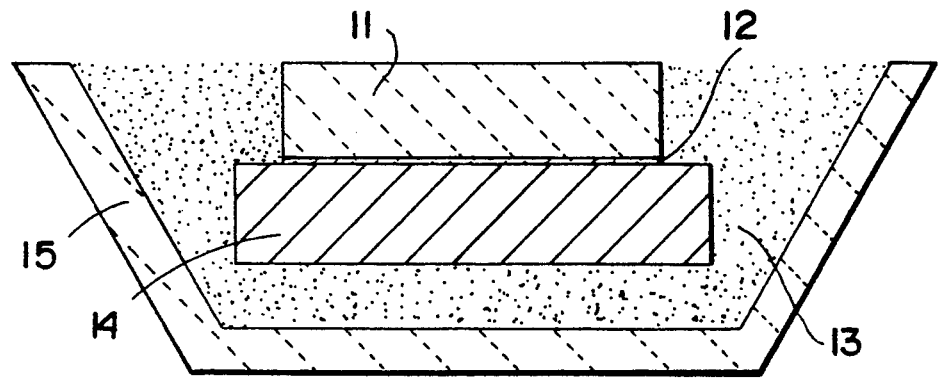
FIG. 1 is a schematic vertical cross-sectional view showing an assembly of a parent metal ingot 14 adjacent to a permeable preform 11 comprising a filler material mixture, having a layer of a dopant material 12 sandwiched between the parent metal ingot and the preform, surrounded by a bedding of support material 13, all contained within a refractory vessel 15.

In accordance with the present invention, self-supporting ceramic composite bodies are produced by reacting a molten parent metal with an oxidant to form an oxidation reaction product, said oxidation reaction product embedding a filler material mixture. The filler material mixture comprises a mixture of one or more materials which may be utilized as a loose, unbonded and permeable mass or may be configured to form a permeable preform having a predetermined shape or geometry. The filler material mixture may comprise mixtures of materials having a similar chemical composition (e.g., SiC and SiC) but having a different particle size, shape or morphology. The mixture may also comprise mixtures of materials having a different chemical composition (e.g., SiC and $Al_2O_3$) and having substantially the same or substantially different particle sizes, shapes or morphologies. In referring to different filler materials, it is intended that the differences constitute differences in size, shape, composition, etc.

In a preferred embodiment of the invention, the filler material mixture comprises a mass of filler material or a preform of filler material containing varying particle sizes of one or more materials having a similar (e.g., SiC and SiC particulate of different sizes) or a different (e.g., SiC and $Al_2O_3$ particulate of different sizes) chemical composition, which may enhance the packing efficiency of the filler material mixture, thus increasing the amount of filler material in a resulting ceramic composite body relative to a ceramic composite body which does not have such efficient particle packing. Properties such as hardness, erosion resistance, corrosion resistance, etc., may be enhanced due to the increased packing efficiency of particles in the formed composite body. Moreover, by using a filler material mixture of appropriate sizes and shapes, a faster growth rate of oxidation reaction product may be achieved. While applicant does not wish to be bound by any one theory, applicant believes that, as compared to a mixture of filler material comprising uniform fine particulate filler material, a filler material comprising varying sizes of coarse and fine filler material is observed to contain larger channels and/or voids between the particles (even though a higher volume percentage of filler may be present due to packing efficiency). Upon contact of molten parent metal with the filler material mixture or preform in the presence of an oxidant, these channels or voids provide a less tortuous path for growth of oxidation reaction product into either a loose mass of filler material or a preform comprised of the above-described filler material mixture. Apparently, when utilizing a filler material mixture, as, for example, in the case of silicon carbide which has been prefired to allow the formation of a protective silicon dioxide coating on the filler material, the level of silicon dioxide formed in combination with the lesser tortuosity in the filler material, may lead to a faster growth rate of oxidation reaction product. It should be noted that the silicon dioxide may act as both a dopant and an oxidant in the formation of oxidation reaction product. Further, due to the higher packing of filler material in a preform comprised of the above-described mixture, less space is available for embedment by oxidation reaction product. This may tend to reduce the overall time necessary for formation of oxidation reaction product to produce a given ceramic matrix composite body. It is believed that the rate of oxidation reaction product growth may be affected by the dopant content, e.g., a silicon source such as $SiO_2$, of the filler material. Specifically, the rate of growth may be a function of the available surface area of dopant coated filler material which provides dopant to the system and the time and temperature at which prefiring is carried out. In some cases, e.g., when a high surface area of dopant coated filler material is utilized, excessive quantities of certain dopants may build up at the interface between the molten metal and the oxidant. This dopant build-up may adversely affect the growth rate of the oxidation reaction product within the body of filler material and thus extend the amount of time needed to grow a ceramic composite body of a given size or thickness.

Although prefiring of the filler material mixture may be beneficial, it is not essential to the formation of ceramic composite bodies by the method of this invention. Specifically, a mixture of non-prefired filler material may be embedded by oxidation reaction product to result in the formation of a ceramic composite body. When the composition of the filler material mixture is harder than the surrounding matrix of oxidation reaction product, the resultant highly-loaded ceramic composite body may exhibit increased hardness, erosion resistance, etc. Further, this method may require the addition of one or more dopant materials to the growth alloy (e.g., in a preferred embodiment a silicon-containing dopant) to permit the formation of oxidation reaction product. One potential difficulty with not prefiring the filler material is the formation of aluminum carbide upon reaction of aluminum parent metal with a non-prefired silicon carbide filler material. The temperature at which the oxidation reaction is carried out and time of reaction may be used to control the formation of aluminum carbide by carrying out the oxidation reaction at temperatures below about 950° C.

A typical manufacturing or experimental set-up is shown in FIG. 1. A parent metal ingot 14 (which may be doped, as explained in more detail below) is positioned adjacent to a permeable, unbonded mass or preform of a filler material mixture 11, having a layer of dopant material 12 sandwiched between the parent metal ingot and the preform. The preform-metal ingot assembly is surrounded by a bed of substantially nonreactive support material 13, contained within a refractory boat 15, which acts as a barrier to growth of oxidation reaction product. The system is maintained in the presence of an oxidant (e.g., a vapor phase oxidant) at a temperature, or within a temperature range, sufficient to allow formation of oxidation reaction product which embeds the permeable filler material.

Figure 2:
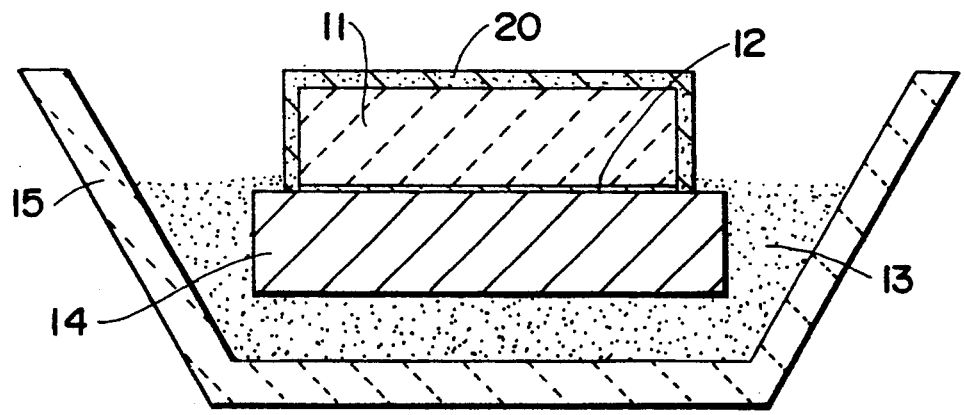
FIG. 2 is a schematic vertical cross-sectional view showing an assembly of a parent metal ingot 14 adjacent to a permeable preform 11 comprising a filler material mixture, having a layer of a dopant material 12 sandwiched between the parent metal ingot and the preform, the preform being coated on the surfaces exposed to the atmosphere with a barrier material layer 20 and partially emplaced within a bedding of support material 13, all contained in a refractory vessel 15.

Another typical experimental set-up is shown in FIG. 2. A parent metal ingot 14 (which may be doped, as explained in more detail below), is positioned adjacent to a permeable, unbonded mass of a filler material mixture, having a layer of dopant material 12 sandwiched between the parent metal ingot and the preform. The preform is coated on the surfaces exposed to the atmosphere with a barrier material layer 20 which prevents growth of oxidation reaction product beyond the exposed surfaces of the mass or preform of filler material mixture. The parent metal ingot and barrier coated mass or preform of filler material mixture are supported by a bed 13 of substantially nonreactive support material contained within a refractory boat 15. The system is maintained in the presence of an oxidant (e.g., a vapor-phase oxidant) at a temperature, or within a temperature range, sufficient to allow formation of oxidation reaction product which embeds the permeable filler material.

A solid, liquid, or vapor-phase oxidant, or a combination of such oxidants, may be employed. For example, typical oxidants include, without limitation, oxygen, nitrogen, a halogen, sulphur, phosphorus, arsenic, carbon, boron, selenium, tellurium, and/or compounds and combinations thereof, for example, silica (as a source of oxygen), methane, ethane, propane, acetylene, ethylene, and propylene (as sources of carbon), and mixtures such as air, $H_2/H_2O$ and $CO/CO_2$ the latter two (i.e., $H_2/H_2O$ and $CO/CO_2$) being useful in reducing the oxygen activity of the environment. Accordingly, the ceramic structure of the invention may comprise an oxidation reaction product comprising one or more of oxides, nitrides, carbides, borides and oxynitrides. More specifically, the oxidation reaction product may, for example, be one or more of aluminum oxide, aluminum nitride, silicon carbide, silicon boride, aluminum boride, titanium nitride, zirconium nitride, titanium boride, zirconium boride, titanium carbide, zirconium carbide, silicon nitride, hafnium boride and tin oxide. Although the oxidation reaction is usually described as employing a vapor-phase oxidant, either alone or in conjunction with an oxidant which is a solid or liquid under the process conditions, it should be understood that the utilization of a vapor-phase oxidant is not necessary to produce the ceramic matrix composite body. When a vapor-phase oxidant is not employed and an oxidant which is a solid or liquid under the process conditions is used, the preform need not be permeable to the surrounding atmosphere. However, the preform should still be sufficiently permeable to accommodate the development or growth of the oxidation reaction product as a matrix within the preform without substantially disturbing, upsetting, or otherwise altering the configuration or geometry of the preform.

The use of solid or liquid oxidants may create an environment within the preform more favorable to the oxidation kinetics of the parent metal than the environment outside the preform. This enhanced environment is beneficial in promoting matrix development within the preform to the boundary and minimizing overgrowth. When a solid oxidant is employed, it may be dispersed through the entire preform or through a portion of the preform adjacent to the parent metal, such as in particulate form and admixed with the preform, or it may be utilized as coatings on the particles comprising the preform. Suitable solid oxidants may include suitable elements, such as boron or carbon, or suitable reducible compounds, such as silicon dioxide (as a source of oxygen) or certain borides of lower thermodynamic stability than the boride reaction product of the parent metal.

If a liquid oxidant is employed, the liquid oxidant may be dispersed throughout the entire preform or a portion thereof adjacent to the molten parent metal. Reference to a liquid oxidant means one which is a liquid under the oxidation reaction conditions, and so a liquid oxidant may have a solid precursor, such as a salt, which is molten or liquid at the oxidation reaction conditions. Alternatively, the liquid oxidant may be a liquid precursor, e.g. a solution of a material, which is used to coat part or all of the porous surfaces of the preform and which is melted or decomposed at the process conditions to provide a suitable oxidant moiety. Examples of liquid oxidants as herein defined include low melting glasses.

As explained in the Commonly Owned Patent Applications and Patents, the addition of dopant materials, in conjunction with, for example, aluminum parent metal, can favorably influence the oxidation reaction process. The function or functions of the dopant material can depend upon a number of factors other than the dopant material itself. These factors include, for example, the end product desired, the particular combination of dopants when two or more dopants are used, the use of externally applied dopants in combination with an alloyed dopant, the concentration of the dopant(s), the oxidizing environment, and the process conditions.

The dopant or dopants used in conjunction with the parent metal (1) may be provided as alloying constituents of the parent metal, (2) may be applied to at least a portion of the surface of the parent metal, (3) may be added to the filler material, or any combination of techniques (1), (2) and (3) may be employed. For example, an alloyed dopant may be used in combination with an externally applied dopant. A source of the dopant may be provided by placing either a dopant powder or a rigid body of dopant in contact with at least a portion of the parent metal surface. For example, a thin sheet of silicon-containing glass can be placed upon a surface of an aluminum parent metal. When the aluminum parent metal (which may be internally doped with Mg) overlaid with the silicon-containing material is heated in an oxidizing environment (e.g., in the case of aluminum in air, between about 850° C. to about 1450° C., preferably about 900° C. to about 1350° C.), growth of the polycrystalline ceramic material occurs. In the case where the dopant is externally applied to at least a portion of the surface of the aluminum parent metal, the polycrystalline aluminum oxide structure generally grows substantially beyond the dopant layer (i.e., to beyond the depth of the applied dopant layer). In any case, one or more of the dopants may be externally applied to the parent metal surface. Additionally, any concentration deficiencies of the dopants alloyed within the parent metal may be augmented by additional concentration of the respective dopant(s) applied external to the parent metal.

Useful dopants for an aluminum parent metal, particularly with air as the oxidant, include, for example, magnesium, zinc and silicon, in combination with each other or in combination with other dopants described below. These metals, or a suitable source of the metals, may be alloyed into the aluminum-based parent metal at concentrations for each of between about 0 1-10% by weight based on the total weight of resulting doped metal. Concentrations within this range appear to initiate the ceramic growth, enhance metal transport and favorably influence the growth morphology of the resulting oxidation reaction product. The concentration range for any one dopant will depend on such factors as the combination of dopants and the process temperature.

Other dopants which are effective in promoting alumina polycrystalline oxidation reaction product growth, from aluminum parent metal systems are, for example, germanium, tin and lead, especially when used in combination with magnesium. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1-10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

In the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium and lithium, which may be used individually or in combination with one or more other dopants depending on the process conditions. Sodium and lithium may be used in very small amounts (in the parts per million range, typically about 100-200 parts per million) and each may be used alone or together, or in combination with other dopant(s). Calcium, boron, phosphorus, yttrium, and rare earth elements such as cerium, lanthanum, praseodymium, neodymium and samarium are also useful dopants, and herein again especially when used in combination with other dopants.

The dopant materials, when used externally, are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum based parent metal using air or oxygen as the oxidant, quantities as low as 0.00003 gram of silicon per gram of parent metal, or about 0.0001 gram of silicon per square centimeter of exposed parent metal surface, together with a second dopant source of magnesium, have been used to produce the polycrystalline ceramic growth phenomenon. It also has been found that a ceramic structure is achievable from an aluminum-silicon alloy parent metal using air or oxygen as the oxidant by using MgO as the dopant in an amount greater than about 0.0008 gram of Mg per gram of parent metal to be oxidized and greater than 0.003 gram of Mg per square centimeter of parent metal surface upon which the MgO is applied.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (e.g., the "initiation surface") in the grown ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting prior to using the polycrystalline ceramic product.

In an alternative embodiment of the invention, during growth of the polycrystalline oxidation reaction product, a different vapor-phase oxidant can be introduced. In this context, "different" should be understood as meaning having a composition which is chemically different from the composition of an initial vapor (or solid) phase oxidant. Thus, the second oxidation reaction product formed with the "different" vapor-phase oxidant will result in the formation of two ceramic bodies or phases integrally attached to each other having graded properties (e.g., a layer can be formed on a first formed ceramic composite body).

In yet another embodiment of the invention, the metallic constituent in the ceramic composite body can be tailored by changing the composition thereof. Specifically, for example, a second metal can be alloyed with or diffused into the parent metal during, for example, growth of oxidation reaction product to change favorably the composition, and thus, mechanical, electrical and/or chemical properties of the parent metal.

To assist in forming a shaped ceramic composite body, a barrier means can be used in conjunction with a filler material or a preform. Specifically, a barrier means which is suitable for use with this invention may be any suitable means which interferes, inhibits, or terminates growth or development of the oxidation reaction product. Suitable barrier means may be any material, compound, element, composition, or the like, which, under the process conditions of this invention, maintains some integrity, is not volatile and preferably is permeable to a vapor-phase oxidant, if a vapor-phase oxidant is used, while being capable of locally inhibiting, poisoning, stopping, interfering with, preventing, or the like, continued growth of the oxidation reaction product.

It appears that one category of barrier means is that class of materials which may be substantially non-wettable by the transported molten parent metal. A barrier of this type appears to exhibit substantially little or no affinity for the molten metal, and growth is terminated or inhibited by the barrier means. Other barriers tend to react with the transported molten parent metal to inhibit further growth either by dissolving into and diluting the transported metal excessively or by forming solid reaction products (e.g., intermetallics, which obstruct the molten metal transport process). A barrier of this type may be a metal or metal alloy, including any suitable precursor thereto such as an oxide or a reducible metal compound, or a dense ceramic material. Because of the nature of the growth inhibition or obstruction process with this type of barrier, growth may extend into or somewhat beyond the barrier before growth is terminated. Nevertheless, the barrier reduces any final machining or grinding that may be required of the formed oxidation reaction product. As stated above, the barrier should preferably be permeable or porous, and therefore, when a solid, impermeable wall is used, the barrier should be opened in at least one zone or at one or both ends to permit the vapor-phase oxidant to contact the molten parent metal.

Suitable barriers particularly useful in this invention in the case of using aluminum parent metals and employing air as oxidant are calcium sulfate, calcium silicate, and tricalcium phosphate. These barriers appear to react locally with developing oxidation reaction product to form an impermeable calcium aluminate layer which locally terminates further growth of oxidation reaction product. Such barriers typically may be applied as a slurry or paste to the surfaces of a filler material mixture bed which preferably is preshaped as a preform. The barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler material mixture bed is especially desirable. For example, if the preform comprises alumina and the resulting ceramic comprises alumina, the barrier may be admixed with alumina particulate, desirably having a mesh size of about 20–1000. The alumina particulate may be mixed with the calcium sulfate, for example, in a ratio ranging from about 10:1 to 1:10, with the preferred ratio being about 1:1. In one embodiment of the invention, the barrier means includes an admixture of calcium sulfate (i.e. Plaster of Paris and portland cement). The portland cement may be mixed with the Plaster of Paris in a ratio of 10:1 to 1:10, with the preferred ratio of portland cement to Plaster of Paris being about 1:3. Where desired, portland cement may also be used alone as the barrier material.

Another embodiment, when using an aluminum parent metal and air as the oxidant, comprises using as a barrier Plaster of Paris admixed with silica in a stoichiometric amount, but there can be an excess of Plaster of Paris. During processing, the Plaster of Paris and silica react to form calcium silicate, which results in a particularly beneficial barrier in that it is substantially free of fissures. In still another embodiment, the Plaster of Paris is admixed with about 25–40 weight percent calcium carbonate. On heating, the calcium carbonate decomposes emitting carbon dioxide, thereby enhancing the porosity of the barrier means.

Other particularly useful barriers for aluminum-based parent metal systems include ferrous materials (e.g., a stainless steel container), chromia and other refractory oxides, which may be employed as a superimposed wall or container to the filler material mixture bed, or as a layer to the surface of a filler material mixture bed. Additional barriers include dense, sintered or fused ceramics such as alumina. These barriers are usually impermeable, and therefore are either specially fabricated to allow for porosity or require an open section such as an open end. The barrier means may form a friable product under the reaction conditions and can be removed as by abrading to recover the ceramic body.

The barrier means may be manufactured or produced in any suitable form, size, and shape, and preferably is permeable to the vapor-phase oxidant. The barrier means may be applied or utilized as a film, paste, slurry, pervious or impervious sheet or plate, or a reticulated or foraminous web such as a metal or ceramic screen or cloth, or a combination thereof. The barrier means also may comprise some filler and/or binder.

The size and shape of the barrier means depends on the desired shape for the ceramic product. By way of example only, if the barrier means is placed or situated at a predetermined distance from the parent metal, growth of the ceramic matrix would be locally terminated or inhibited where it encounters the barrier means. Generally, the shape of the ceramic product is the inverse of the shape of the barrier means. For example, if a concave barrier is at least partially spaced from a parent metal, the polycrystalline growth occurs within the volumetric space defined by the boundary of the concave barrier and the surface area of the parent metal. Growth terminates substantially at the concave barrier. After the barrier means is removed, a ceramic body remains having at least a convex portion defined by the concavity of the barrier means. It should be noted that with respect to a barrier means having porosity, there may be some polycrystalline material overgrowth through the interstices, although such overgrowth is severely limited or eliminated by the more effective barrier materials. In such a case, after the barrier means is removed from the grown polycrystalline ceramic body, any polycrystalline overgrowth may be removed from the ceramic body by grinding, grit blasting or the like, to produce the desired ceramic part with no remaining overgrowth of polycrystalline material. By way of a further illustration, a barrier means spaced from a parent metal, and having a cylindrical protuberance in the direction of the metal, will produce a ceramic body with a cylindrical recess inversely replicating the same diameter and depth of the cylindrical protuberance.

In order to achieve minimal or no polycrystalline material overgrowth in the formation of ceramic composites, the barrier means may be placed on, or positioned in close proximity to, the defined surface boundary of any filler material mixture bed or preform. Disposal of the barrier means on the defined surface boundary of the bed or preform may be performed by any suitable means, such as by layering the defined surface boundary with the barrier means. Such layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, growth of the polycrystalline oxidation reaction product terminates upon reaching the defined surface boundary of the preform and contacting the barrier means.

In a preferred embodiment for manufacturing a ceramic matrix composite body, a permeable shaped preform of a filler material mixture (described below in greater detail) is formed having at least one defined surface boundary with at least a portion of the defined surface boundary having or superimposed with the barrier means. It should be understood that the term "preform" may include an assembly of separate preforms ultimately bonded into an integral composite. The preform is placed adjacent to and in contact with one or more parent metal surfaces or a portion of a surface of the parent metal such that at least a portion of the defined surface boundary having or superimposed with the barrier means is generally positioned distantly or outwardly from the metal surface, and formation of the oxidation reaction product will occur into the preform and in a direction towards the defined surface boundary with the barrier means. The permeable preform is part of the lay-up, and upon heating in a furnace, the parent metal and the preform are exposed to or enveloped by the vapor-phase oxidant, which may be used in combination with a solid or liquid oxidant. The metal and oxidant react, and the reaction process is continued until the oxidation reaction product has infiltrated the preform and comes in contact with the defined surface boundary having or superimposed with the barrier means. Most typically, the boundaries of the preform, and of the polycrystalline matrix, substantially coincide; but individual constituents at the surfaces of the preform may be exposed or may protrude from the matrix, and therefore infiltration and embedment may not be complete in terms of completely surrounding or encapsulating the preform by the matrix. The barrier means prevents, inhibits or terminates growth upon contact with the barrier means, and substantially no overgrowth of the polycrystalline material occurs. The resulting ceramic composite product includes a preform infiltrated or embedded to its boundaries by a ceramic matrix comprising a polycrystalline material consisting essentially of the oxidation reaction product of the parent metal with the oxidant and, optionally, one or more metallic constituents such as non-oxidized constituents of the parent metal or reduced constituents of an oxidant.

Examples of filler material mixtures useful in the invention, depending upon parent metal and oxidation systems chosen, include one or more of aluminum oxide, silicon carbide, silicon aluminum oxynitride, zirconium oxide, zirconium boride, titanium nitride, barium titanate, boron nitride, silicon nitride, ferrous alloys, e.g., iron-chromium-aluminum alloy, carbon, aluminum and mixtures thereof. However, any suitable filler material mixture may be employed in the invention, and three specific classes of useful filler material mixtures may be identified.

The first class of filler material mixtures contains those chemical species which, under the temperature and oxidizing conditions of the process, are not volatile, are thermodynamically stable and do not react with or dissolve excessively in the molten parent metal. Numerous materials are known to those skilled in the art as meeting such criteria in the case where aluminum parent metal and air or oxygen as the oxidant are employed. Such materials include the single-metal oxides of: aluminum, $Al_2O_3$; cerium, $CeO_2$; hafnium, $HfO_2$; lanthanum, $La_2O_3$; neodynium, $Nd_2O_3$; praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition, a larger number of binary, ternary, and higher order metallic compounds such as magnesium aluminate spinel, $MgO\ Al_2O_3$, are contained in this class of stable refractory compounds.

The second class of suitable filler material mixtures are those which are not intrinsically stable in the oxidizing and high temperature environment of the process, but which, due to relatively slow kinetics of the degradation reactions, can be incorporated as a filler phase within the growing ceramic body. An example in the case of an alumina ceramic matrix is silicon carbide. This material would oxidize completely under the conditions necessary to oxidize aluminum with oxygen or air in accordance with the invention were it not for a protective layer of silicon oxide forming and covering the silicon carbide particles to limit further oxidation of the silicon carbide.

A third class of suitable filler material mixtures are those which are not, on thermodynamic or on kinetic grounds, expected to survive the oxidizing environment or exposure to molten metal necessary for practice of the invention. Such filler mixtures can be made compatible with the process of the present invention 1) if the oxidizing environment is made less active, or 2) through the application of a coating thereto, which makes the species kinetically nonreactive in the oxidizing environment. An example of such a class of filler mixtures would be carbon fibers of varying sizes employed in conjunction with a molten aluminum parent metal. If the aluminum is to be oxidized with air or oxygen at, for example, 1250° C., to generate a matrix incorporating the fiber, the carbon fiber will tend to react with both the aluminum (to form aluminum carbide) and the oxidizing environment (to form CO or $CO_2$). These unwanted reactions may be avoided by coating the carbon fiber (for example, with alumina) to prevent reaction with the parent metal and/or oxidant and optionally employing a $CO/CO_2$ atmosphere as oxidant which tends to be oxidizing to the aluminum but not to the carbon fiber.

In a particularly preferred embodiment, it is possible to provide a of filler material or preform comprising about 50-60 volume percent of about 54 grit filler, about 15-25 volume percent of about 90 grit filler, about 10-20 volume percent of about 180 grit filler and about 5-15 volume percent of about 500 grit filler material. By incorporating a filler material having the stated composition, a ceramic composite body may be formed possessing enhanced corrosion and erosion resistance properties, as compared to a ceramic composite body incorporating a substantially uniform particle size filler material, as shown in Table 1.

In a further embodiment, it may be possible to form a ceramic matrix composite body having graded properties by varying the particle sizes of the regions of the mass or preform of filler material mixture in a manner to obtain a desired result. Specifically, it may be possible to form a ceramic matrix composite body having in at least one portion properties which are characteristic of a ceramic composite body formed by embedding a substantially uniform mass of filler material and in at least one other portion properties which are characteristic of a ceramic composite body formed by embedding a mass of filler material comprising a filler material mixture of varying size and/or shape. More specifically, a ceramic matrix composite body having a composition which exhibits higher flexural strength in one portion relative to a second portion and higher wear resistance in the second portion of the body may be formed by providing a mass of filler material mixture or preform comprising a filler material mixture wherein one portion contains filler material of a substantially uniform particle size to provide an area of higher flexural strength, and a different area of the filler material or preform may comprise a filler material mixture of varying size and/or shape to result in a portion of the ceramic composite body exhibiting enhanced wear or corrosion resistance properties. In this manner, a ceramic body may be tailored to possess enhanced properties to serve a specific need.

EXAMPLE 1

This example was performed to demonstrate the growth of a composite material having an alpha-alumina matrix incorporating a filler material mixture comprising silicon carbide filler material of various particle sizes. A 6"33 6"×1.5" preform comprising silicon carbide particles was formed by mixing about 55 weight percent 180 grit SiC, about 25 weight percent 220 grit SiC, and about 20 weight percent 500 grit SiC and ball milling this mixture for about 10 minutes. The silicon carbide particulate was obtained from Norton Company, and is sold under the trade name 39 Crystolon. After the ball milling step, a slurry was prepared by hand mixing a mixture comprising the blended silicon carbide particles, about 19 percent by weight deionized water, about 4 percent by weight Elmers Wood Glue from Borden Company, and a defoaming agent sold under the trade name Colloids 581B from Colloids, Inc., located in Newark, N.J. When the slurry mixture had a uniform consistency, it was sediment cast into a 6"×6"×1.5" rubber mold. The slurry filled mold was air dried for one hour and then placed in a freezer for approximately 12 hours at a temperature of about −17° C. The preform was then removed from the mold and placed in a drying oven for about 2-3 days at a temperature of about 60°-70° C.

Referring to FIG. 1, which is a cross-sectional view of an assembly described in detail below, a 7"×6"×2" ingot 14 of a parent metal aluminum alloy having the approximate composition by weight 7.5-9.5 percent Si, 3.0-4.0 percent Cu, <2.9 percent Zn, <1.5 percent Fe, <0.5 percent Mn, <0.5 percent Ni, <0.35 percent Sn, and <0.18 percent Mg, the balance being aluminum, was placed onto a bed 13 of Wollastonite, a coarse fibrous calcium silicate material sold under the trade name Nyad-SP from Nyco, Inc., which was contained in a refractory boat 15. A layer 12 of a powdered material consisting primarily of silica and sold under the trade name Leecote ™ LX-60 WPS by Acme Resin Corporation of Madison, Ohio, was mixed with approximately 40 percent by weight ethyl alcohol to provide a slurry, and the slurry was then painted onto the exposed surface of the aluminum alloy ingot 14 in a thickness of approximately 1 mm. The silicon carbide preform 11, prepared above, was placed on top of the surface of the aluminum alloy ingot which had been coated with the Leecote ™ layer 12, and additional wollastonite bedding 13 was placed around the preform 11 to a level substantially flush with the exposed surface of the preform. The system, comprising the refractory boat and its contents, was placed into an electrical resistance heated furnace and the temperature was ramped from room temperature to about 900° C. in about 7 hours, held at about 900° C. for about 200 hours, then ramped down to about 700° C. in about one hour. When the system temperature reached about 700° C., the preform was carefully dislodged from the unreacted alloy, removed from the furnace and allowed to cool to ambient temperature on a bed of sand.

The above procedure produced a self-supporting ceramic composite body having an alpha-alumina matrix embedding the silicon carbide preform. Test samples of this ceramic composite body were subjected to physical and mechanical testing and the results are reported in Table 1.

EXAMPLE 2

The method of Example 1 was substantially repeated, except that the preform comprised silicon carbide particles (39 Crystolon from Norton Company) which were sediment cast into a 6"×6"×1.5" preform having a nominal composition of 55 weight percent 90 grit SiC, 20 weight percent 180 grit SiC, 15 weight percent 220 grit SiC, and 10 weight percent 500 grit SiC. The system, comprising the refractory boat and its contents, was heated from room temperature to about 900° C. in about 5 hours, held at about 900° C. for about 300 hours, then ramped down to about 700° C. in about one hour before the preform was carefully dislodged from the unreacted alloy, removed from the furnace and allowed to cool to ambient temperature on a bed of sand.

The above procedure produced a self-supporting ceramic composite body having an alpha-alumina matrix embedding the silicon carbide preform. Test samples of this ceramic composite body were subjected to physical testing and the results are reported in Table 1.

EXAMPLE 3

The method of Example 1 was substantially repeated, except that the preform comprised silicon carbide particles (39 Crystolon from Norton Company) which were sediment cast into a 6"×6"×1.5" preform having a nominal composition of 55 weight percent 54 grit SiC, 20 weight percent 90 grit SiC, 15 weight percent 180 grit SiC, and 10 weight percent 500 grit SiC. The system, comprising the refractory boat and its contents, was heated from room temperature to about 900° C. in about 7 hours, held at about 900° C. for about 200 hours, then ramped down to about 700° C. in about one hour before the preform was carefully dislodged from the unreacted alloy, removed from the furnace and allowed to cool to ambient temperature on a bed of sand.

The above procedure produced a self-supporting ceramic composite body having an alpha-alumina matrix embedding the silicon carbide preform. Test samples of this ceramic composite body were subjected to physical and mechanical testing and the results are reported in Table 1.

EXAMPLE 4

The method of Example 1 was substantially repeated, except that the preform comprised silicon carbide particles (39 Crystolon from Norton Company) which were sediment cast into a 6"×6"×1.5" preform having a nominal composition of 55 weight percent 24 grit SiC, 20 weight percent 54 grit SiC, 15 weight percent 180 grit SiC, and 10 weight percent 500 grit SiC. The system, comprising the refractory boat and its contents, was heated from room temperature to about 900° C. in about 7 hours, held at about 900° C. for about 200 hours, then ramped down to about 700° C. in about one hour before the preform was carefully dislodged from the unreacted alloy, removed from the furnace and allowed to cool to ambient temperature on a bed of sand.

The above procedure produced a self-supporting ceramic composite body having an alpha-alumina matrix embedding the silicon carbide preform. Test samples of this ceramic composite body were subjected to physical and mechanical testing and the results are reported in Table 1.

EXAMPLE 5

The method of Example 1 was substantially repeated, except that the preform comprised silicon carbide particles (39 Crystolon from Norton Company) which were sediment cast into a 6"×6"×1.5" preform having a nominal composition of 55 weight percent 14 grit SiC, 20 weight percent 54 grit SiC, 15 weight percent 180 grit SiC, and 10 weight percent 500 grit SiC. The system, comprising the refractory boat and its contents, was heated from room temperature to about 900° C. in about 7 hours, held at about 900° C. for about 200 hours, then ramped down to about 700° C. in about one hour before the preform was carefully dislodged from the unreacted alloy, removed from the furnace and allowed to cool to ambient temperature on a bed of sand.

The above procedure produced a self-supporting ceramic composite body having an alpha-alumina matrix embedding the silicon carbide preform. Test samples of this ceramic composite body were subjected to physical and mechanical testing and the results are reported in Table 1.

TABLE 1

| | Coarse Grit SiC Blends (Sediment Cast - 900° C.) | | | | | |
|---|---|---|---|---|---|---|
| Largest Grit Size | Example 5 14 | Example 4 24 | Example 3 54 | Example 2 90 | Example 1 180 | (Comparison at 900° C.) uniform 500 (unblended) |
| Density (g/cc) | 3.20 | 3.28 | 3.32 | 3.24 | 3.31 | 3.339 |
| Hardness $R_A$ | 82.8 | 78–79 | 80 | 79 | 78 | 78.14 |
| Flexural Strength (MPa) | 89 | 115 | 147 | 154 | 181 | 352 |
| Fracture Toughness (MPa m$^{\frac{1}{2}}$) | 5.40 | — | — | 6.8 | — | 7.71 |
| Shear Modulus (MPa) | 149 | 151 | 131 | 125 | 132 | 120 |
| Young's Modulus (MPa) | 364 | 362 | 313 | 308 | 337 | 305 |
| Poisson Ratio | 0.22 | 0.20 | 0.19 | 0.24 | 0.27 | .26 |
| *Dry Erosion Rate (cc/hour) | .26–.30 | .25–.58 | .36–.39 | .81 | 2.39 | 3.74–5.35 |
| Thermal Exp. Coefficient (/°C.) | $5.28 \times 10^{-6}$ | — | — | $5.99 \times 10^{-6}$ | — | $7.5–7.0 \times 10^{-6}$ |
| Phase Analysis (%) | | | | | | |
| SiC | 66.2 | 73.9 | 65.5 | 59.6 | 61.7 | |
| Al$_2$O$_3$ Matrix | 19.9 | 18.2 | 24.5 | 27.5 | 26.0 | |
| Metal | 10.9 | 5.74 | 8.16 | 12.5 | 13.9 | |
| Porosity | 2.9 | 1.96 | 1.59 | 0.28 | 0.46 | |

*Dry Grit Blast Test Conditions
Media: 80#–120# SiO$_2$
Pressure: 40 psi
Distance: 3 cm
Time: 5 minutes
Angle: 30°

What is claimed is:

1. A method for producing a self-supporting ceramic composite structure exhibiting enhanced wear resistance, comprising (1) a ceramic matrix obtained by oxidation of a parent metal to form a polycrystalline material comprising (i) the oxidation reaction product of said parent metal with an oxidant and, optionally, (ii) one or more nonoxidized constituents of the parent metal; and (2) a filler material comprising at least one material having a hardness higher than the hardness of the ceramic matrix embedded by said ceramic matrix, the method comprising the steps of:

(a) forming a mixture of a permeable mass of filler material comprising about 50–60 volume percent of about 54 grit filler material, about 15–25 volume percent of about 90 grit filler material, about 10–20 volume percent of about 180 grit filler material and about 5–15 volume percent of about 500 grit filler material to achieve a packing density of about 55–80 percent;

(b) positioning said parent metal adjacent to said permeable mass of filler material and orienting said parent metal and said mass of filler material relative to each other so that formation of said oxidation reaction product will occur in a direction towards and into said mass of filler material; and (c) heating said parent metal to a temperature above its melting point but below the melting point of said oxidation reaction product to form a body of molten parent metal and reacting the molten parent metal with said oxidant at said temperature to form said oxidation reaction product, and at said temperature maintaining at least a portion of said oxidation reaction product in contact with and extending between said body of molten metal and said oxidant, to draw molten metal through the oxidation reaction product towards the oxidant and towards and into the adjacent mass of filler material so that oxidation reaction product continues to form within the mass of filler material at the interface between the oxidant and previously formed oxidation reaction product, and continuing said reacting for a time sufficient to embed at least a portion of the mass of filler material within said polycrystalline material; and (d) recovering said self-supporting ceramic composite structure.

2. The method of claim 1, wherein said mass of filler material comprises a mixture of filler material comprising varying composition of filler material.

3. A method for producing a self-supporting ceramic composite structure exhibiting enhanced corrosion resistance, comprising (1) a ceramic matrix obtained by oxidation of a parent metal to form a polycrystalline material comprising (i) the oxidation reaction product of said parent metal with an oxidant and, optionally, (ii) one or more nonoxidized constituents of the parent metal; and (2) a filler material comprising at least one material having a corrosion resistance higher than the corrosion resistance of the ceramic matrix embedded by said ceramic matrix, the method comprising the steps of:

(a) forming a mixture of a permeable mass of filler material comprising about 50–60 volume percent of about 54 grit filler material, about 15–25 volume percent of about 90 grit filler material, about 10–20 volume percent of about 180 grit filler material and about 5–15 volume percent of about 500 grit filler material to achieve a packing density of about 55–80 percent;

(b) positioning said parent metal adjacent to said permeable mass comprising said filler material mixture and orienting said parent metal and said permeable mass relative to each other so that formation of said oxidation reaction product will occur in a direction towards and into said permeable mass; and (c) heating said parent metal to a temperature above its melting point but below the melting point of said oxidation reaction product to form a body of molten parent metal and reacting the molten parent metal with said oxidant at said temperature to form said oxidation reaction product, and at said temperature maintaining at least a portion of said oxidation reaction product in contact with and extending between said body of molten metal and said oxidant, to draw molten metal through the oxidation reaction product towards the oxidant and towards and into the adjacent permeable mass so that oxidation reaction product continues to form within the permeable mass at the interface between the oxidant and previously formed oxidation reaction product, and continuing said reacting for a time sufficient to embed at least a portion of the permeable mass within said polycrystalline material; and (d) recovering said ceramic composite structure.

4. The method of claim 3, wherein said preform of filler material comprises a mixture of filler material comprising varying composition of filler material.

5. The method of claim 1, wherein said filler material further comprises at least one material selected from the group consisting of aluminum oxide, silicon carbide, silicon aluminum oxynitride, zirconium oxide, zirconium boride, titanium nitride, barium titanate, boron nitride, silicon nitride, ferrous alloys, aluminum, carbon, and mixtures thereof.

6. The method of claim 5, wherein said filler material comprises silicon carbide.

7. The method of claim 3, wherein said filler material comprises at least one material selected from the group consisting of aluminum oxide, silicon carbide, silicon aluminum oxynitride, zirconium oxide, zirconium boride, titanium nitride, barium titanate, boron nitride, silicon nitride, ferrous alloys, aluminum, carbon, and mixtures thereof.

8. The method of claim 7, wherein said filler material comprises silicon carbide.

9. The method of claim 1, wherein said permeable mass of filler material is selected from the group consisting of a loose mass of filler material and a preform of filler material.

10. The method of claim 3, wherein said permeable mass of filler material is selected from the group consisting of a loose mass of filler material and a preform of filler material.

* * * * *